United States Patent [19]

Hohmann

[11] Patent Number: 5,379,562
[45] Date of Patent: Jan. 10, 1995

[54] FLOW-THROUGH CAP AND STIRRUP FOR REINFORCEMENT BARS AND METHOD OF USE THEREOF

[76] Inventor: Ronald P. Hohmann, 32 Stratford Pl., Syosset, N.Y. 11791

[21] Appl. No.: 11,757

[22] Filed: Feb. 1, 1993

[51] Int. Cl.⁶ .............................................. F16B 7/00
[52] U.S. Cl. ........................................ 52/295; 52/431; 52/565; 52/726.3; 52/728; 52/730.2; 52/743; 52/747; 403/391; 403/393; 403/396
[58] Field of Search .................... 267/180, 166.1, 166; 52/726.1, 726.3, 728, 730.2, 743, 747, 565, 562, 418, 425, 426, 431, 432, 687, 295; 403/393, 391, 389, 305

[56] References Cited

U.S. PATENT DOCUMENTS

| | | | |
|---|---|---|---|
| 577,220 | 2/1897 | Whitehead | 403/391 X |
| 1,035,816 | 8/1912 | Allen | 52/726.1 X |
| 2,254,566 | 9/1941 | Cornell, Jr. | 267/180 X |
| 2,278,324 | 3/1942 | Kollmann | 267/166 X |
| 3,245,189 | 4/1966 | Reiland | 52/726.3 X |
| 3,340,667 | 9/1969 | Reiland | 52/726.1 X |
| 3,390,905 | 7/1968 | Stewart | 52/726.1 X |
| 3,480,309 | 11/1969 | Harris | 52/726.1 X |
| 3,679,250 | 7/1972 | Mardsen | 52/726.1 X |
| 3,694,012 | 9/1972 | Gelfand | 52/726.1 X |
| 4,034,529 | 7/1977 | Lampus | 52/426 |
| 4,080,084 | 3/1978 | Williams | 403/393 |
| 4,362,423 | 12/1982 | Miles | 403/393 |
| 4,968,176 | 11/1990 | Balach | 403/393 |
| 5,127,763 | 7/1992 | Kunoki | 403/393 X |

Primary Examiner—Carl D. Friedman
Assistant Examiner—Robert J. Canfield
Attorney, Agent, or Firm—Siegmar Silber

[57] ABSTRACT

A flow-through cap and stirrup for reinforcement bars in a building wall and method of use thereof is disclosed. The building wall is formed from successive layers of masonry blocks having cells therethrough which form a hollow vertical core. Usually and particularly in earthquake prone areas, construction practices include the insertion and grouting in place of a pair of overlapping reinforcement bars within the core formed by the masonry blocks. The device of this invention is a cap and stirrup unit for holding the reinforcement bars in the requisite position. The device is formed from a coil spring with spaced apart coils, and has two elongated cells, namely, a cap portion and a stirrup portion. Each portion has a wall with a closed end and an open end. The cap has a channel which, when installed, accommodates the head of the lower reinforcement bar. Conversely, the stirrup has a channel which, when installed, accommodates the foot of the upper reinforcement bar. The cap and stirrup are connected together so that the predetermined overlap is maintained. Because of the openness of the structure, the cement or mortar used for grouting flows into and through the cap and stirrup portion and bonds the reinforcement bars are within the core of the masonry blocks.

16 Claims, 2 Drawing Sheets

FLOW-THROUGH CAP AND STIRRUP FOR REINFORCEMENT BARS AND METHOD OF USE THEREOF

BACKGROUND OF THE INVENTION

1. Field of the Invention

This invention relates to a reinforcement device and method of use thereof for masonry block walls, and more particularly to a flow-through cap and stirrup for reinforcement bars. In the device one side covers the head of an installed reinforcement bar; and the other, supports the foot of a reinforcement bar under installation. In this manner, the flow-through cap and stirrup device holds two overlapping reinforcement bars within a block core without impeding the pouring of a cementitious mixture therearound.

2. Description of the Prior Art

Several patents descriptive of reinforcement bar connectors are known to the inventor hereof. These patents are as follows:

| U.S. Pat. No. | Inventor | Issue Date |
| --- | --- | --- |
| 4,968,176 | Balach | 11/06/90 |
| 4,764,071 | Lawrence et al. | 08/16/88 |
| 4,641,989 | Maddi | 02/10/87 |
| 4,362,423 | Miles | 12/10/82 |
| 3,825,465 | Stock | 07/23/74 |
| 3,679,250 | Marsden | 07/25/72 |
| 3,480,309 | Harris | 11/25/69 |
| 3,390,905 | Stewart | 07/02/68 |
| 3,376,684 | Cole et al. | 04/09/68 |
| 3,245,189 | Reiland | 04/12/66 |

Of the patents disclosed above, Lawrence et al. '071, Maddi '989, Marsden '250, Harris '309 and Reiland '189 concern splicing reinforcement bars or other structural components in an end-to-end relationship with a part of the attachment device clamping to one end of the bar. In these patents, the remaining portion forms a receptacle in which the end of another reinforcement bar is clamped or into which the end is threaded or otherwise attached. In all the patents, there is a mechanical tie between the reinforcement bar and the attaching device.

Further, of the patents disclosed above, Balach '176, Miles '423, and Stewart '905, concern clamping reinforcement bars or other structural components in an overlapping side-by-side relationship (with or without one bar having an inflected end portion to maintain the same axial alignment of the body of the bar). In these patents, emphasis is on tieing, clamping and securing the devices in frictional contact (Balach '176), positive interengagement (Miles '423), and encircling abutment (Stewart '905).

The patents to Balach '176, Stock '465, and Cole et al., teach the use of expanded sheet metal with Balach '176 and Stock '465 applying the same to holding structural reinforcing members.

By way of background, building codes in all areas require vertical reinforcement of concrete masonry. In areas which experience seismic activity, the code requirements are particularly stringent. In placing vertical reinforcement advantage is taken of the vertical alignment of hollow block cores which form wells in which the reinforcing bars are placed and grouted solid with poured mortar or concrete.

SUMMARY

In general terms, the invention disclosed hereby includes a device and a method for reinforcing a building wall. The building wall is formed from successive layers of masonry blocks having cells therethrough which form a hollow vertical core. Usually and particularly in earthquake prone areas, construction practices include the insertion and grouting in place of a pair of overlapping reinforcement bars within the core formed by the masonry blocks. The device of this invention is a cap and stirrup unit for holding the reinforcement bars in the requisite position. The device is formed from a coil spring with spaced apart coils, and has two elongated cells, namely, a cap portion and a stirrup portion. Each portion has a wall with a closed end and an open end. The cap has a channel which, when installed, accommodates the head of the lower reinforcement bar. Conversely, the stirrup has a channel which, when installed, accommodates the foot of the upper reinforcement bar. The cap and stirrup are connected together so that the predetermined overlap is maintained. Because of the openness of the structure, the cement or mortar used for grouting flows into and through the cap and stirrup portion and bonds the reinforcement bars are within the core of the masonry blocks.

OBJECTS AND FEATURES OF THE INVENTION

It is an object of the present invention to provide a labor-saving device to aid in the installation and securement of reinforcing bars in concrete masonry.

It is a further object of the present invention to provide a reinforcing bar fitting which avoids tieing with wire or threading of connectors.

It is yet another object of the present invention to provide a flow-through device which will not impede the flow of concrete or mortar to grout solidly the core.

It is still yet another object of the present invention to provide an enhanced embedment of the reinforcement bars in the solid grout.

It is a feature of the present invention that the cap portion of the device hereof rests on the head of the lower reinforcement bar and that the foot of the upper reinforcement bar rests in stirrup portion of the device.

Other objects and features of the invention will become apparent upon review of the drawings and the detailed description which follow.

BRIEF DESCRIPTION OF THE DRAWINGS

In the following drawings, the same parts in the various views are afforded the same reference designators.

DESCRIPTION OF THE PREFERRED EMBODIMENTS

Figure 1:
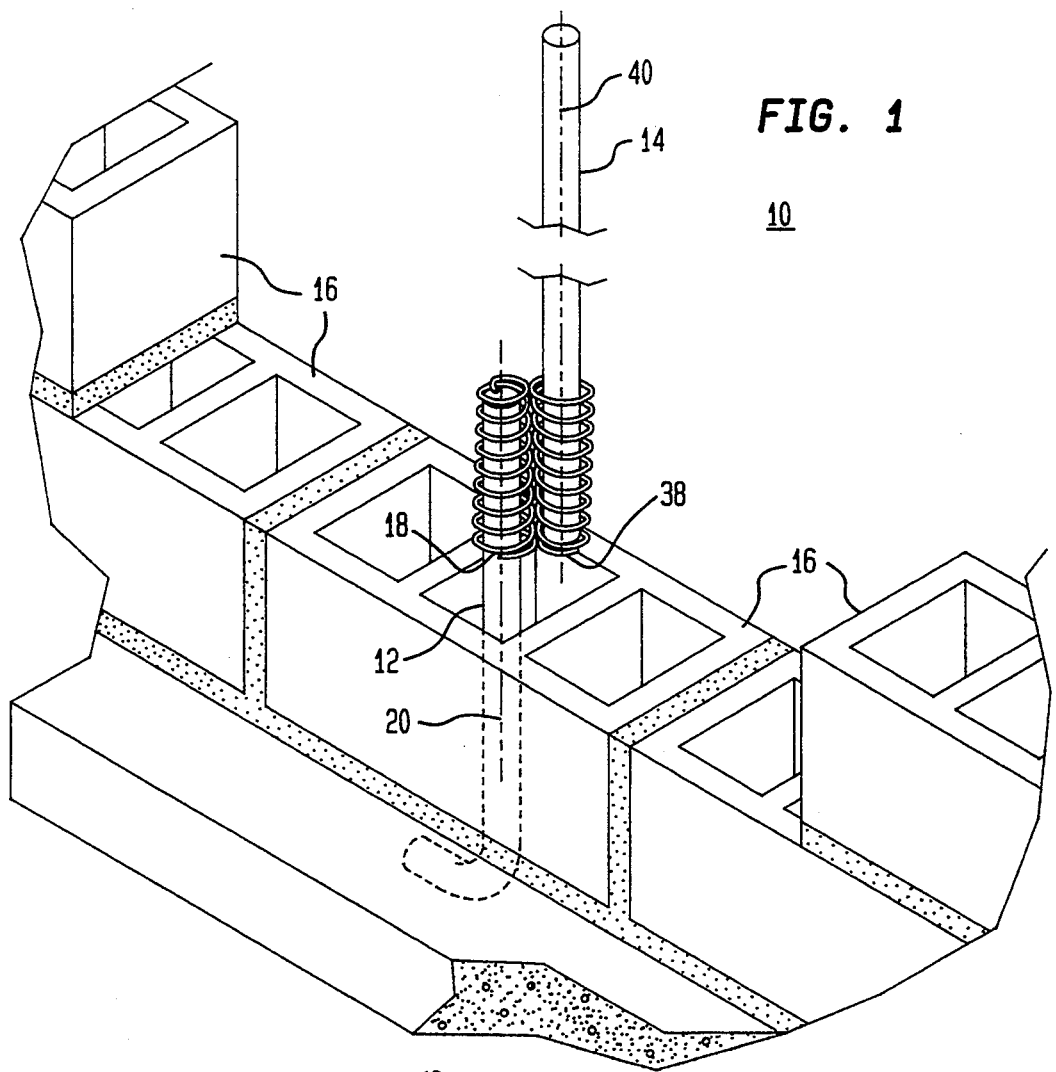
FIG. 1 is a perspective view of a flow through cap and stirrup for reinforcement bars of the present invention and for clarity the device is shown a lower and an upper reinforcement bar against the background of a masonry core or cell.
Figure 2:
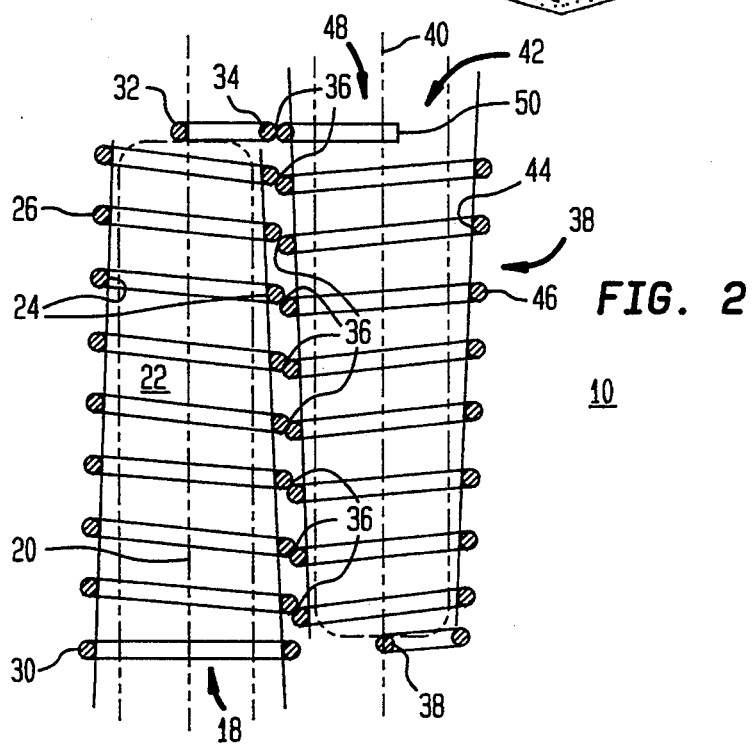
FIG. 2 is a vertical cross-sectional diagram of the invention shown in FIG. 1 and has the profile of the inner opening represented by a solid line.

In the best mode of practicing this invention, the flow-through cap and stirrup for reinforcement bars is a pair of adjoining spirally wound frustoconical retainers, see FIGS. 1 and 2.

Referring now to FIG. 1, the cap and stirrup assembly, generally referred to by the numeral 10, is shown with two reinforcement bars 12 and 14 inserted therewithin against a background of consecutive layers of building block cells 16. The cap portion 18 is shown with the longitudinal axis 20 thereof coincident with the longitudinal axis of the first or lower reinforcement bar 12. As shown, the assembly or device 10 is constructed to rest on the head of the lower bar 12 without frictionally engaging or being tied thereto. In the cross-sectional diagram, this effect can be seen more clearly. Here, the lower passageway 22 for the head of lower reinforcement bar 12 is shown by solid lines tangential to the inside 24 of the spirally wound wire 26. Although the spiral is constructed around a straight tapered passageway 24, the contour thereof can employ various curves to facilitate entry of the reinforcement bar or to limit the end play within the building block cell. Likewise, although the horizontal cross section of the passageway 24 is circular, the contour thereof can be varied so as to be elliptical with the major and minor axes selected to best fit the application at hand. In this embodiment, the cap 18 is formed from a single wire 26 having an entryway 28 at the lowermost winding 30 and a terminus or headrest 32 at the uppermost winding 34. Optionally, the headrest 32 can be eliminated, especially in cases in which a longer overlap of reinforcement bars is desired or required than the available cap and stirrup assembly provides. Adjacent and attached to cap portion 18, at the juncture 36 thereof by spot welds is stirrup portion 38 which also is shown against the building block cells 16. The stirrup portion is shown with the longitudinal axis 40 thereof coincident with the longitudinal axis of the second or upper reinforcement bar 14. As shown, the assembly or device 10 is constructed to accept the foot of the upper bar 14 resting in the stirrup portion 38 without frictionally engaging or being tied thereto. As previously, this effect can be seen clearly in the cross-sectional diagram. The upper passageway 42 for the foot of upper reinforcement bar 14 is shown by solid lines tangential to the inside 44 of the spirally wound wire 46. Although this spiral is also constructed around the straight tapered passageway 44, the contour thereof can also employ various curves to facilitate entry of the reinforcement bar or to limit the within building block cell. Obviously, the shaping of the envelope is limited by a need for sufficient fit at the juncture 36. The stirrup portion 38 is formed from a single wire 46 having an entryway 48 at the uppermost winding 50 and a terminus or footrest 52 at the lowermost winding 54.

Figure 3:
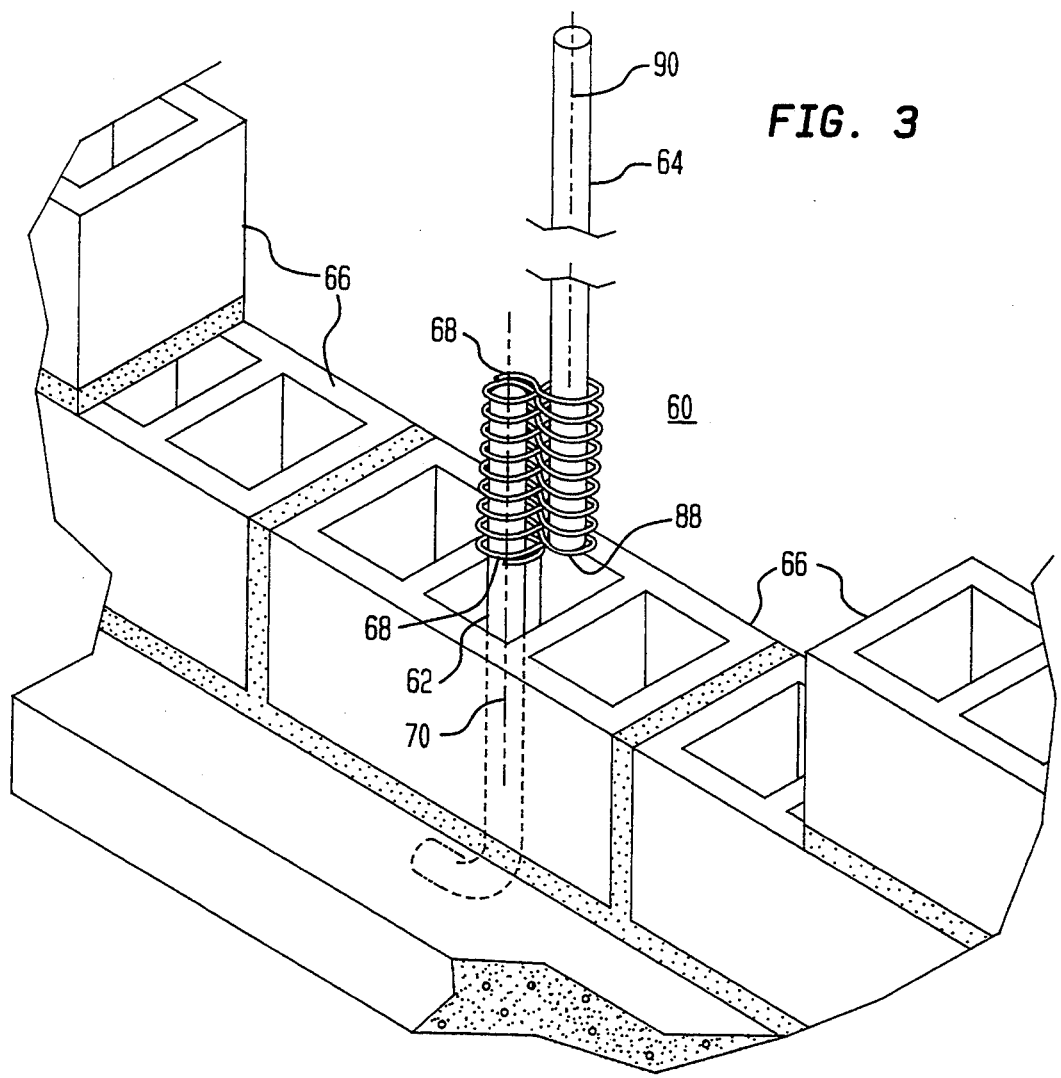
FIG. 3 is a perspective view of a second embodiment of a flow through cap and stirrup for reinforcement bars of the present invention and for clarity the device is shown a lower and an upper reinforcement bar against the background of a masonry core or cell; and, FIG. 4 is a vertical cross-sectional diagram of the invention shown in FIG. 3 and has the profile of the inner opening represented by a solid line.
Figure 4:
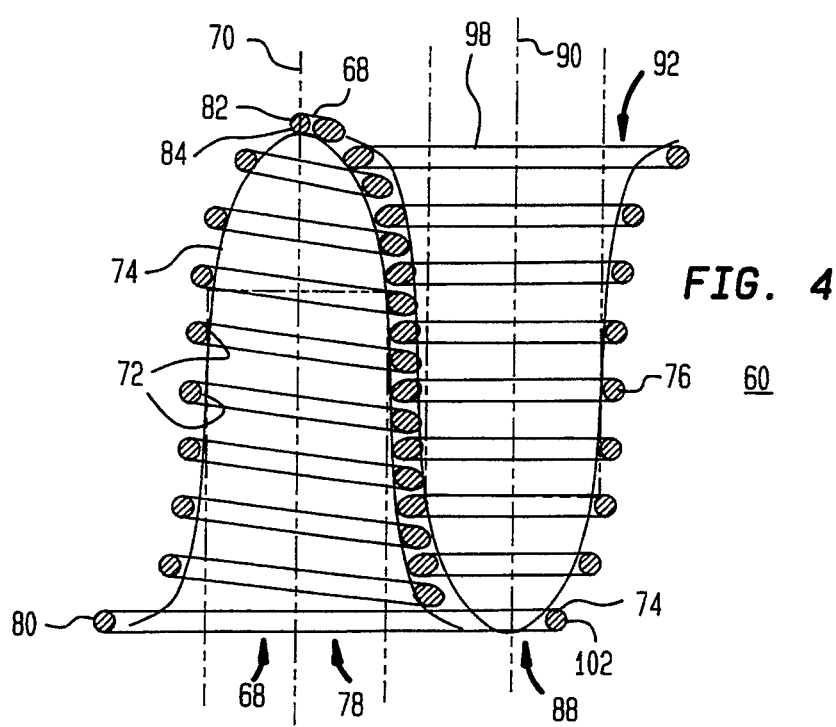

Referring now to FIGS. 3 and 4, a second embodiment of the cap and stirrup assembly is shown. In this embodiment, a single wire is wound in a layer of "figure eights" configuration with the first side of the figure eight starting small and the second side thereof being enlarged. The winding dimensions continuously change with the final winding reversing the dimensional relationship of the starting loop so that in the final winding, the first side has the enlarged loop and the second side thereof has the small loop. Here, the cap and stirrup assembly is referred to by the numeral 60. Reinforcement bars 62 and 64 are inserted therewithin against a background of consecutive layers of building block cells 66. The cap portion 68 is shown with longitudinal axis 70 thereof coincident with the longitudinal axis of the first reinforcement bar 62. The cap portion 68 rests on the head of the lower bar 62 without frictionally engaging or being tied thereto. As in the above, the lower bar passageway 72 profile is best seen in the cross-sectional view. In this embodiment, the profile 74 is a bell-shaped curve with the mouth of the bell aiding the installation. Both the cap portion 68 and stirrup portion (described below) are formed from a single wire 76. The cap portion 68 an entryway 78 at the lowermost loop 80 and a terminus or headrest 82 at the uppermost loop 84. As in the first embodiment, the headrest 82 can be eliminated, especially in cases in which a longer overlap of reinforcement bars is desired or required than the available cap and stirrup assembly provides. The stirrup portion 88 is shown with longitudinal axis 90 coincident with the longitudinal axis of the second reinforcement bar 64. The stirrup portion 88 provides a footrest for the foot of the upper bar 64 without frictionally engaging or being tied thereto. The upper bar passageway 92 has an entryway 98 at the uppermost loop 84 and a terminus or footrest 102 at lowermost loop 80.

In operation, in placing vertical reinforcement practical advantage is taken of the vertical alignment of hollow block cores which formwells into which the reinforcement bars are placed and grouted solid with poured mortar or concrete. The frequency of use of vertical reinforcement bars within a given wall span is dependent on several parameters, namely, (1) engineering design and analysis; (2) requirements engendered by local seismic conditions; (3) requirements engendered by local climatic conditions, especially wind and rain; and, (4) local building codes. At locations where vertical reinforcement is to occur, when the wall is laid up, the bottom block is often left out for a cleanout hole. The first few courses of block are laid up over J-bars that are embedded in the underlying concrete work. As the top of the J-bar is covered by a course of block, a cap and stirrup device, as described hereinabove is placed over the head thereof and the laying up of the wall is continued. Of course, where a longer overlap is desired, the requirement is anticipated and before the upper courses of block are positioned a stop or collar is attached to the J-bar at the predetermined length and a cap and stirrup device without a headrest is emplaced thereon. As the height of the additional courses approaches the length of the reinforcement bar being emplaced, the bar is lowered into the well or cavity so that the foot thereof rests in the stirrup of the cap and stirrup device previously deposited. Just prior to setting steel reinforcement bars in place, the wells are rodded clean of extruded mortar and debris and debris removed from the cleanout hole. After cleaning, setting bars and inspection, cleanouts are closed with side forms and the wells are grouted solid. Post-construction analysis shows that because of the spaced array of the spring wire of the cap and stirrup device and the roundness of the spring wire, the mortar or concrete flows through the cap and stirrup device into the patterned interstices of the reinforcement bar exterior and bonds thereto. The invention described herein improves the reinforcing action of the building materials used by enhancing this bonding process.

To reinforce masonry block building walls, this invention utilizes a method having the following steps. The method uses the device described hereinabove for holding reinforcement bars in place during grouting. In earthquake prone areas, the reinforced cores are increased in accordance with the seismic rating required. In the form of method steps, it is first described as one which employs the primary steps a. through e. set forth below. The method of this invention comprises the steps of:

a. laying up courses of masonry block over the J-bar reinforcement bar until the head of the J-bar is within the uppermost course;
b. placing a flow through cap and stirrup unit on the head of the J-bar;
c. laying up additional courses of masonry block until the added wall height is the length of the reinforcement bar to be inserted in the core thereof;
d. threading the reinforcement bar into the core and placing the foot thereof into the stirrup; and,
e. grouting the core with a predetermined cementitious mixture, namely, mortar or cement.

If the building wall is to be constructed beyond that described in the steps above, a portion of the inserted reinforcement bar is left exposed and treated as the J-bar of step a. Then steps a. through e. are repeated as required. Good construction practices and local code enforcement might require the core cleanout provisions, rodding of the core before grouting, and inspecting for compliance purposes. These steps are described in the text, supra.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense. For example, the use of one side of the cap and stirrup device described above without a terminal portion could just as readily be on the stirrup side as on the cap side, and then operationally the stop or collar would limit the descent of the upper reinforcement bar.

What is claimed is:

1. A cap and stirrup device for holding the ends of a pair of overlapping reinforcement bars emplaced within a core of a building wall formed by successive layers of masonry blocks comprising:
    a body formed from a coiled wire formative having coils thereof spaced apart the one from the other, in turn, comprising;
        an elongated cap portion being symmetrical about the longitudinal axis thereof, said cap portion having a wall with a closed end and an open end and a longitudinal crosssection having a first predetermined profile;
        a cap channel extending between said closed end and said open end of said cap portion;
        an elongated stirrup portion being symmetrical about the longitudinal axis thereof, said stirrup portion having a wall with a closed end and an open end and a longitudinal crosssection having a second predetermined profile, said first profile and said second profile being substantially identical;
        a stirrup channel extending between said closed end and said open end of said stirrup portion having a longitudinal axis therethrough being substantially parallel to the longitudinal axis of said cap channel; and,
    a plurality of apertures in said body to permit the flow of a cementitious material into and through said cap portion and said stirrup portion, said apertures formed from spaces between said coils; and,
    whereby, when said pair of reinforcement bars are installed within said cap and stirrup device and said core is filled with cementitious material, a reinforced wall is formed.

2. A cap and stirrup device as described in claim 1 wherein said coiled wire formative is formed from a round wire to facilitate flow of the cementitious material.

3. A cap and stirrup device as described in claim 2 wherein said wall of said cap portion further comprises an outer face and said wall of said stirrup portion further comprises an outer face; and wherein said wall of said cap portion and said wall of said stirrup portion and joined together at the outer faces of said walls with the longitudinal axes thereof parallel the one to the other and the open ends facing opposite directions.

4. A cap and stirrup device as described in claim 3 wherein said device is formed from a single strand of coil spring wire in successive figure eight shaped coils, said coils having one loop thereof decreasing at the same rate as the other loop thereof increases in size.

5. A cap and stirrup device as described in claim 1 wherein said predetermined profiles are substantially identical bell-shaped curves.

6. A cap and stirrup device as described in claim 1 wherein said predetermined profiles are substantially identical frustoconical sections.

7. A reinforcing device for a building wall formed from successive layers of masonry blocks comprising:
    a pair of overlapping reinforcement bars adapted to be emplaced within a core formed by said of masonry blocks;
    a cap and stirrup device formed from a coiled wire formative having coils thereof spaced apart the one from the others, in turn, comprising;
        an elongated cap portion being symmetrical about the longitudinal axis thereof, said cap portion having a wall with a closed end and an open end and a longitudinal cross-section having a first predetermined profile;
        a cap channel extending between said closed end and said open end of said cap portion;
        an elongated stirrup portion being symmetrical about the longitudinal axis thereof, said stirrup portion having a wall with a closed end and an open end and a longitudinal cross-section having a second predetermined profile, said first profile and said second profile being substantially identical;
        a stirrup channel extending between said closed end and said open end of said stirrup portion having a longitudinal axis therethrough being substantially parallel to the longitudinal axis of said cap channel; and,
    a plurality of apertures in said cap and stirrup device, said apertures formed from spaces between the coils to permit the flow of a cementitious material into and through said cap portion and said stirrup portion; and,
    whereby, when said pair of reinforcement bars are installed within said cap and stirrup device and said core is filled with cementitious material, a reinforced wall is formed.

8. A reinforcing device as described in claim 7 wherein said coiled wire formative is formed from a round wire to facilitate flow of the cementitious material.

9. A reinforcing device as described in claim 8 wherein said wall of said cap portion further comprises an outer face and said wall of said stirrup portion further comprises an outer face; and wherein said wall of said cap portion and said wall of said stirrup portion are joined together at the outer faces of said walls with the longitudinal axes thereof parallel the one to the other and the open ends facing opposite directions.

10. A reinforcing device as described in claim 9 wherein said device is formed from a single strand of coil spring wire in successive figure eight shaped coils, said coils having one loop thereof decreasing at the same rate as the other loop thereof increases in size.

11. A reinforcing device as described in claim 7 wherein said predetermined profiles are substantially identical frustoconical sections.

12. A reinforcing device as described in claim 7 wherein said predetermined profiles are substantially identical bell-shaped curves.

13. A reinforcement for a building wall formed from successive layers of masonry blocks comprising, in combination:
   a pair of overlapping reinforcement bars adapted to be emplaced within a core formed by said masonry blocks;
   a cap and stirrup device formed from a coil spring having coils spaced apart the one from the other, in turn, comprising;
      an elongated cap portion having a wall with a closed end and an open end;
      a cap channel extending between said closed end and said open end of said cap portion having a longitudinal axis therethrough;
      an elongated stirrup portion having a wall with a closed end and an open end;
      a stirrup channel extending between said closed end and said open end of said stirrup portion having a longitudinal axis therethrough being substantially parallel to the longitudinal axis of said cap channel; and,
      a plurality of apertures formed from spaces between the coils in said cap and stirrup device to permit the flow of a cementitious material into and through said cap portion and said stirrup portion, and, when said pair of reinforcement bars are therewithin, to permit the bonding thereof within said core of masonry blocks;
   a cementitious piling adapted to be within and completely filling said core of masonry block formed by being poured about said reinforcement bars and said cap and stirrup device.

14. A reinforcement for a building wall as described in claim 13 wherein said elongated cap portion has a longitudinal cross-section with a first predetermined profile and said elongated stirrup portion has a longitudinal cross section with a a second predetermined profile, said first and said second predetermined profiles are substantially identical frustoconical sections.

15. A reinforcement for a building wall as described in claim 14 wherein said coil spring is formed from a round wire to facilitate flow of the cementitious material.

16. A reinforcement for a building wall as described in claim 13 wherein said wall of said cap portion further comprises an outer face and said wall of said stirrup portion further comprises an outer face; and wherein said wall of said cap portion and said wall of said stirrup portion are joined together at the outer faces of said walls with the longitudinal axes thereof parallel the one to the other and the open ends facing opposite directions.

* * * * *